US012638601B2

(12) United States Patent
Wu et al.

(10) Patent No.: US 12,638,601 B2
(45) Date of Patent: May 26, 2026

(54) ELECTRONIC DEVICE

(71) Applicant: InnoCare Optoelectronics Corporation, Tainan City (TW)

(72) Inventors: Chih-Hao Wu, Tainan City (TW); Wen-Chien Lin, Tainan City (TW)

(73) Assignee: InnoCare Optoelectronics Corporation, Tainan City (TW)

( * ) Notice: Subject to any disclaimer, the term of this patent is extended or adjusted under 35 U.S.C. 154(b) by 191 days.

(21) Appl. No.: 18/430,596

(22) Filed: Feb. 1, 2024

(65) Prior Publication Data
US 2024/0302541 A1     Sep. 12, 2024

(30) Foreign Application Priority Data
Mar. 6, 2023   (TW) ................................. 112107976

(51) Int. Cl.
| | | |
|---|---|---|
| *G01T 1/20* | (2006.01) | |
| *G02F 1/1335* | (2006.01) | |
| *G02F 1/167* | (2019.01) | |

(52) U.S. Cl.
CPC ...... *G01T 1/2002* (2013.01); *G02F 1/133553* (2013.01); *G02F 1/167* (2013.01)

(58) Field of Classification Search
CPC .. G01T 1/2002; G02F 1/133553; G02F 1/167
See application file for complete search history.

(56) References Cited

U.S. PATENT DOCUMENTS

| | | | | |
|---|---|---|---|---|
| 5,616,924 A | * | 4/1997 | Petrillo ................. | G01T 1/1642 |
| | | | | 250/368 |
| 9,035,261 B2 | * | 5/2015 | Wang .................... | G01T 1/2002 |
| | | | | 250/362 |
| 2002/0050940 A1 | * | 5/2002 | Sato ....................... | H04N 1/195 |
| | | | | 341/122 |

FOREIGN PATENT DOCUMENTS

| | | |
|---|---|---|
| CN | 1930491 | 3/2007 |

* cited by examiner

*Primary Examiner* — Kiho Kim
(74) *Attorney, Agent, or Firm* — JCIPRNET

(57) ABSTRACT
An electronic device, including a sensing substrate, a scintillator layer, and an adjustable reflective layer, is provided. The scintillator layer is disposed on the sensing substrate. The adjustable reflective layer is disposed on the sensing substrate and includes a first electrode, a second electrode, and an electrophoretic layer. The first electrode is disposed on the scintillator layer. The second electrode is disposed on the first electrode. The electrophoretic layer is disposed between the first electrode and the second electrode. The second electrode surrounds the scintillator layer.

19 Claims, 8 Drawing Sheets

1

R2 R1

Z

1

ELECTRONIC DEVICE

CROSS-REFERENCE TO RELATED APPLICATION

This application claims the priority benefit of Taiwan application serial no. 112107976, filed on Mar. 6, 2023. The entirety of the above-mentioned patent application is hereby incorporated by reference herein and made a part of this specification.

BACKGROUND

Technical Field

The disclosure relates to an electronic device.

Description of Related Art

The indirect type flat panel detector (FPD) converts an X-ray into visible light through a scintillator layer, receives a light signal through a flat panel sensor, and converts the light signal into an electrical signal, so as to obtain an X-ray image of an object irradiated by the X-ray. When the X-ray is converted into the visible light, the visible light is scattered around. Although the light intensity received by the flat panel sensor can be improved by disposing a reflective layer on the scintillator layer, the spatial resolution is poor. On the other hand, the spatial resolution can be improved by disposing a light absorbing layer on the scintillator layer, but the image brightness is poor.

SUMMARY

The disclosure provides an electronic device, which has an adjustable reflective layer with adjustable reflectivity that can satisfy different usage requirements.

In an embodiment of the disclosure, an electronic device includes a sensing substrate, a scintillator layer, and an adjustable reflective layer. The scintillator layer is disposed on the sensing substrate. The adjustable reflective layer is disposed on the sensing substrate and includes a first electrode, a second electrode, and an electrophoretic layer. The first electrode is disposed on the scintillator layer. The second electrode is disposed on the first electrode. The electrophoretic layer is disposed between the first electrode and the second electrode. The second electrode surrounds the scintillator layer.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
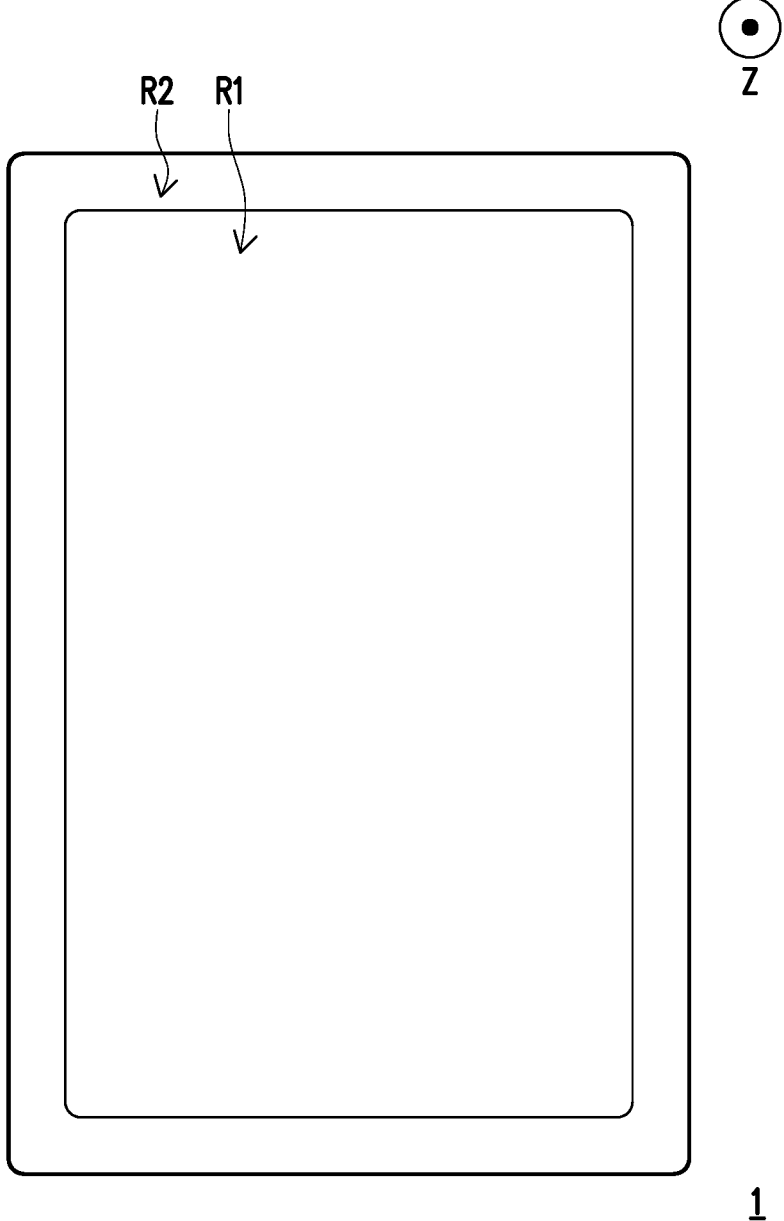
FIG. 1 to FIG. 3 are respectively a top schematic view, an exploded view, and a cross-sectional schematic view of an electronic device according to an embodiment of the disclosure.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Throughout the disclosure and the appended claims, certain terms may be used to refer to specific elements. It should be understood by persons skilled in the art that electronic device manufacturers may refer to the same element by different names. The disclosure does not intend to distinguish between elements with the same function but different names. In the following specification and claims, words such as "containing" and "comprising" are open-ended words, so the words should be interpreted as "including but not limited to . . . ".

Directional terms such as "upper", "lower", "front", "rear", "left", and "right" mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

When a structure (or layer, element, base) is described in the disclosure as being located on/above another structure (or layer, element, base), it may mean that the two structures are adjacent and directly connected or it may mean that the two structures are adjacent but not directly connected. Indirect connection means that there is at least one intermediate structure (or intermediate layer, intermediate element, intermediate base, intermediate spacing) between the two structures. A lower surface of one structure is adjacent or directly connected to an upper surface of the intermediate structure, and an upper surface of the other structure is adjacent or directly connected to a lower surface of the intermediate structure. The intermediate structure may be composed of a single-layer or multi-layer physical structure or non-physical structure, which is not limited. In the disclosure, when a certain structure is disposed "on" another structure, it may mean that the certain structure is "directly" on the other structure or it may mean that the certain structure is "indirectly" on the other structure, that is, at least one structure is also sandwiched between the certain structure and the other structure.

The terms "about", "substantially", or "roughly" are generally interpreted as within 10% of a given value or range, or interpreted as within 5%, 3%, 2%, 1%, or 0.5% of the given value or range. In addition, the terms "a range is from a first value to a second value" and "the range is between the first value and the second value" mean that the range includes the first value, the second value, and other values therebetween.

Ordinal numbers such as "first" and "second" used in the description and the claims are used to modify elements and do not imply and represent that the elements have any previous ordinal numbers, nor do they represent the order of a certain element and another element or the order of a manufacturing method. The use of the ordinal numbers is only used to clearly distinguish between an element with a certain name and another element with the same name. The claims and the description may not use the same terms, whereby a first component in the specification may be a second component in the claims.

In some embodiments of the disclosure, terms such as "connection" and "interconnection" related to bonding and connection, unless otherwise specified, may mean that two structures are in direct contact, or may also mean that the two structures are not in direct contact, wherein there is another structure between the two structures. Also, the terms related to bonding and connection may also include the case where the two structures are both movable or the two structures are both fixed. In addition, the term "electrical connection" includes any direct and indirect electrical connection means.

In the disclosure, the measurement manner of thickness, length, and width may be by adopting an optical microscope (OM), and thickness or width may be measured by a cross-sectional image in an electron microscope, but not limited thereto. In addition, there may be a certain error in any two values or directions for comparison. In addition, the term "a given range is from a first value to a second value", "the given range falls within a range of the first value to the second value", or "the given range is between the first value and the second value" means that the given range includes the first value, the second value, and other values therebetween. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

It should be noted that in the following embodiments, the features in several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms such as the terms defined in commonly used dictionaries should be interpreted as having meanings consistent with the relevant art and the background or context of the disclosure, and should not be interpreted in an idealized or overly formal manner, unless otherwise defined in the embodiments of the disclosure.

The type and the form of an electronic device are not limited. For example, the electronic device may include a display device, a backlight device, an antenna device, a detection device, or a splicing device. In addition, the electronic device may be a bendable or flexible electronic device. The display device may be a non-self-luminous display device or a self-luminous display device. The electronic device may, for example, include liquid crystal, a light emitting diode, fluorescence, phosphor, quantum dot (QD), other suitable display media, or a combination of the above. The antenna device may be a liquid crystal antenna device or a non-liquid crystal antenna device. The detection device may be a detection device for sensing capacitance, light rays (for example, visible light or X-rays), thermal energy, or ultrasonic waves, but not limited thereto. In some embodiments, the electronic device may include an electronic element. The electronic element may include a passive element and an active element, such as a capacitor, a resistor, an inductor, a diode, and a transistor. The diode may include a light emitting diode or a photodiode. The light emitting diode may include, for example, an organic light emitting diode (OLED), a mini LED, a micro LED, or a quantum dot LED, but not limited thereto. The splicing device may be, for example, a display splicing device, a detection splicing device, or an antenna splicing device, but not limited thereto.

It should be noted that the electronic device may be any permutation and combination of the above, but not limited thereto. In addition, the shape of the electronic device may be rectangular, circular, polygonal, a shape with curved edges, or other suitable shapes. The electronic device may have a peripheral system such as a driving system, a control system, and a light source system to support the display device, the antenna device, a wearable device (for example, including augmented reality or virtual reality), a vehicle-mounted device (for example, including a car windshield), or the splicing device.

Figure 2:
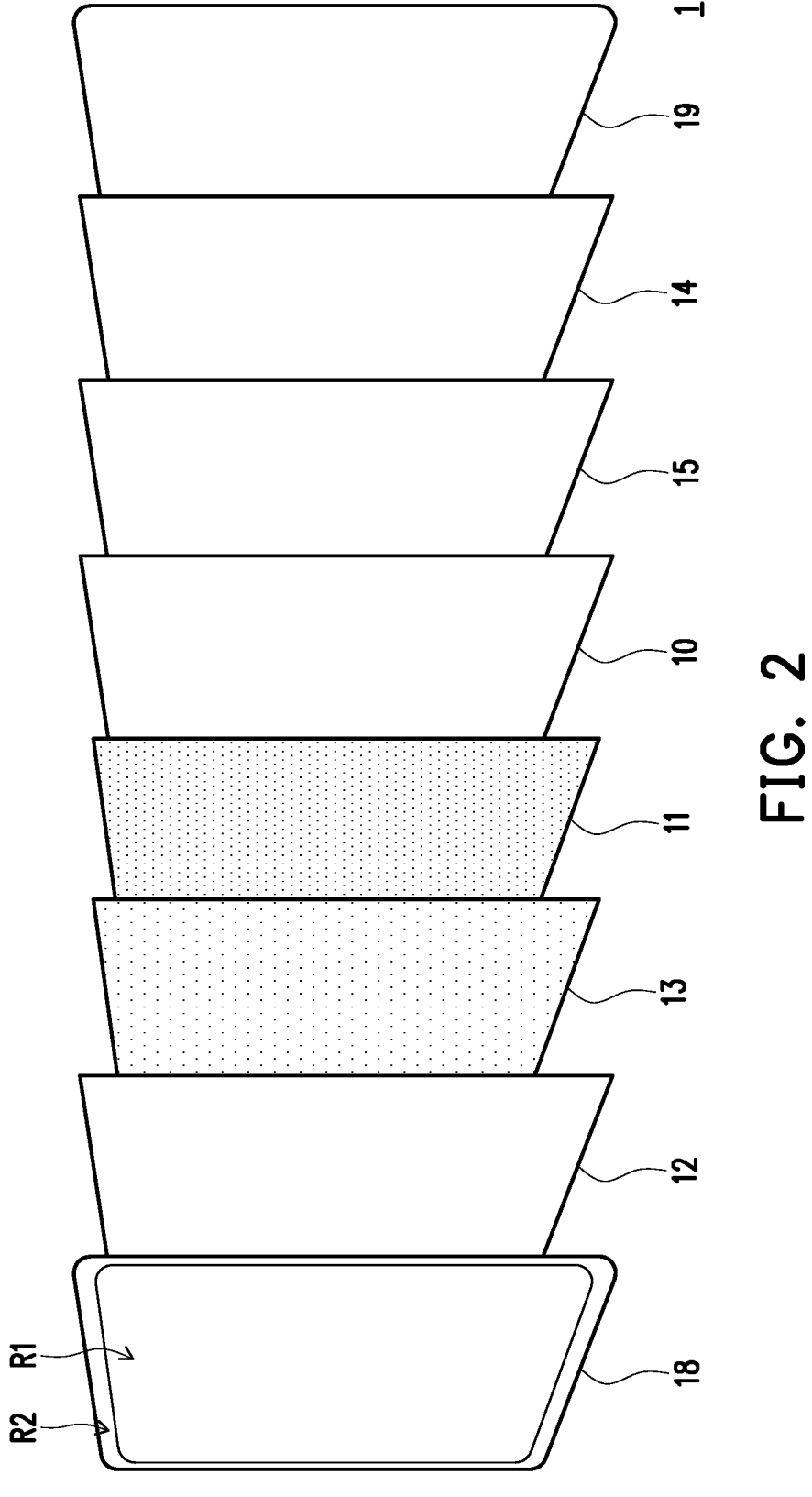
Figure 3:
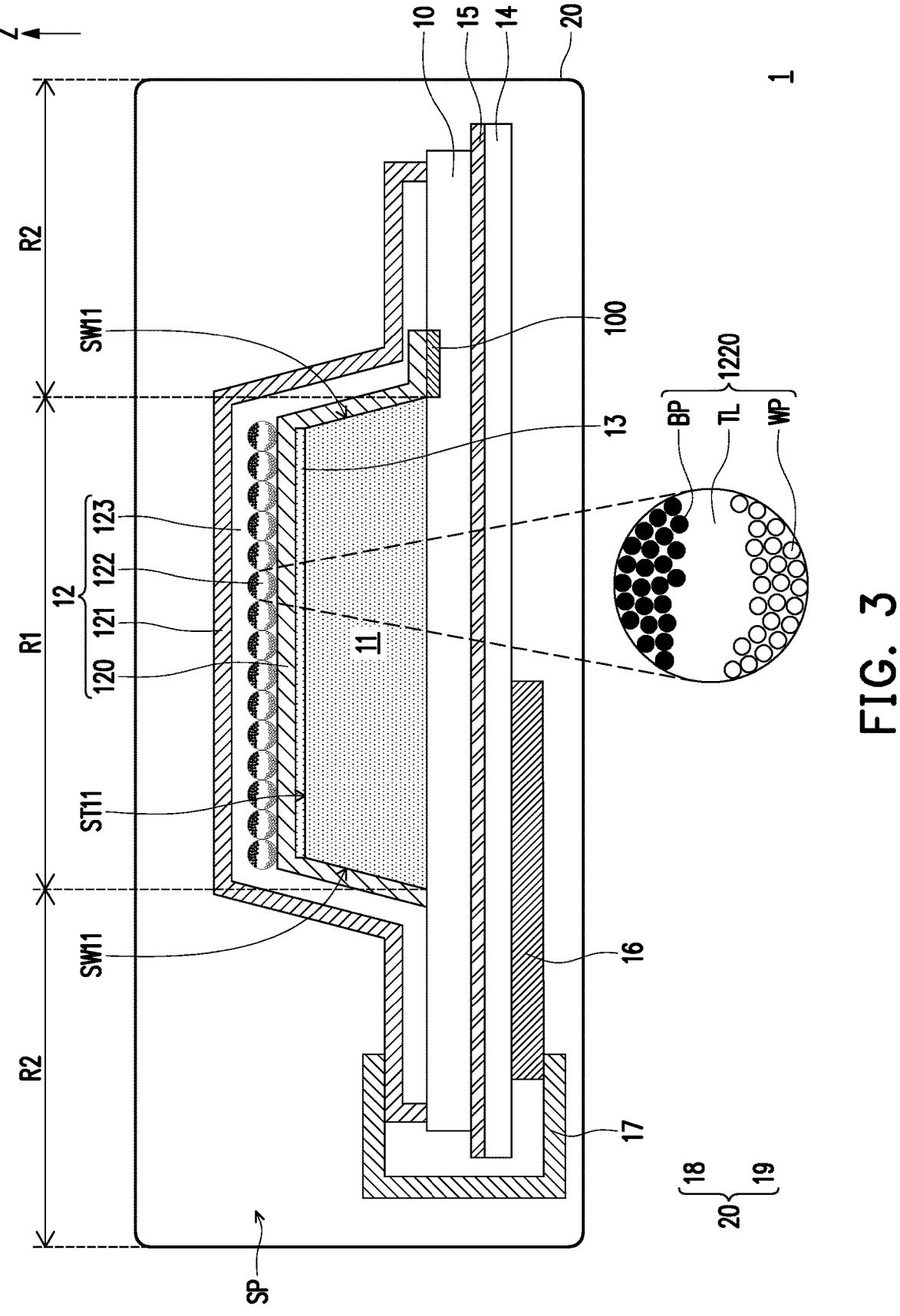
Figure 5:
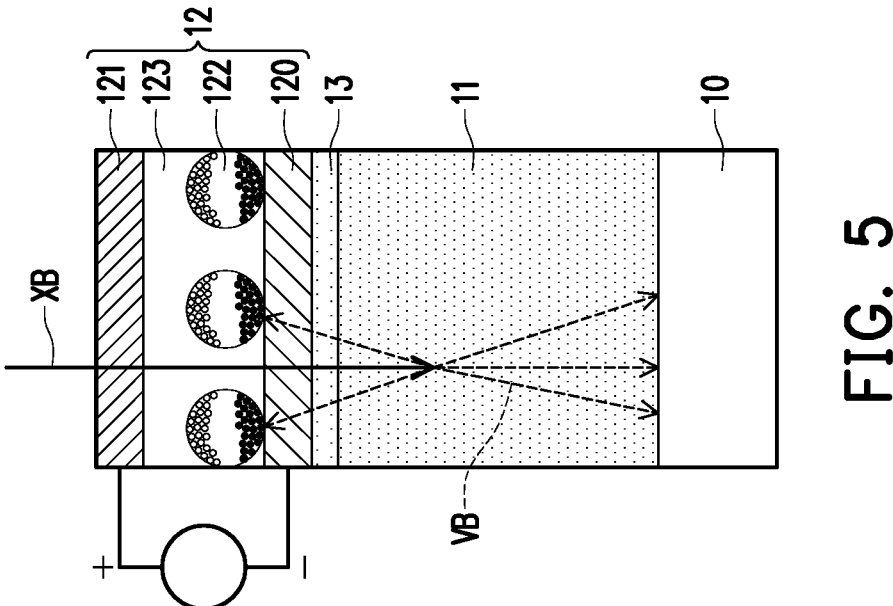
FIG. 4 and FIG. 5 are respectively a partial cross-sectional schematic view of the electronic device of FIG. 3 when switched to high reflectivity and low reflectivity.
Figure 4:
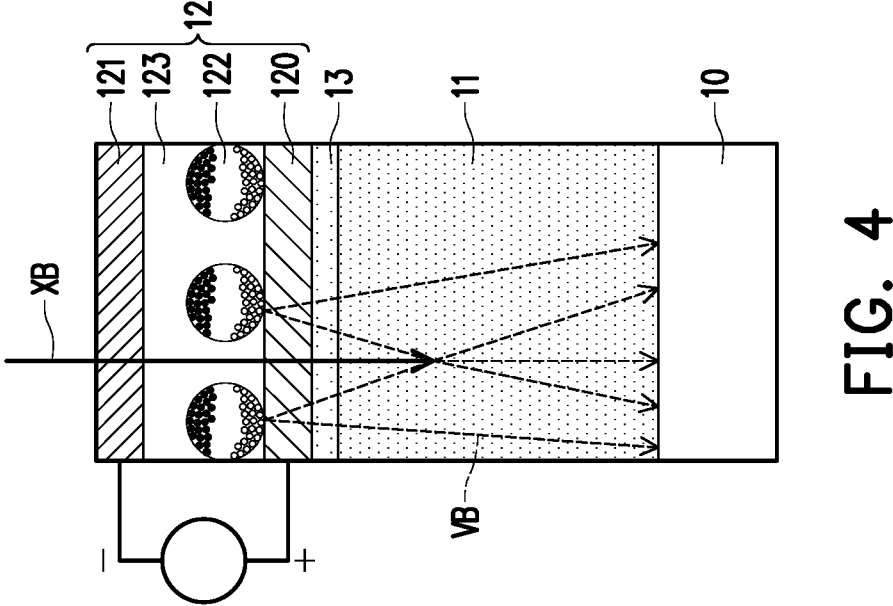
Figure 6:
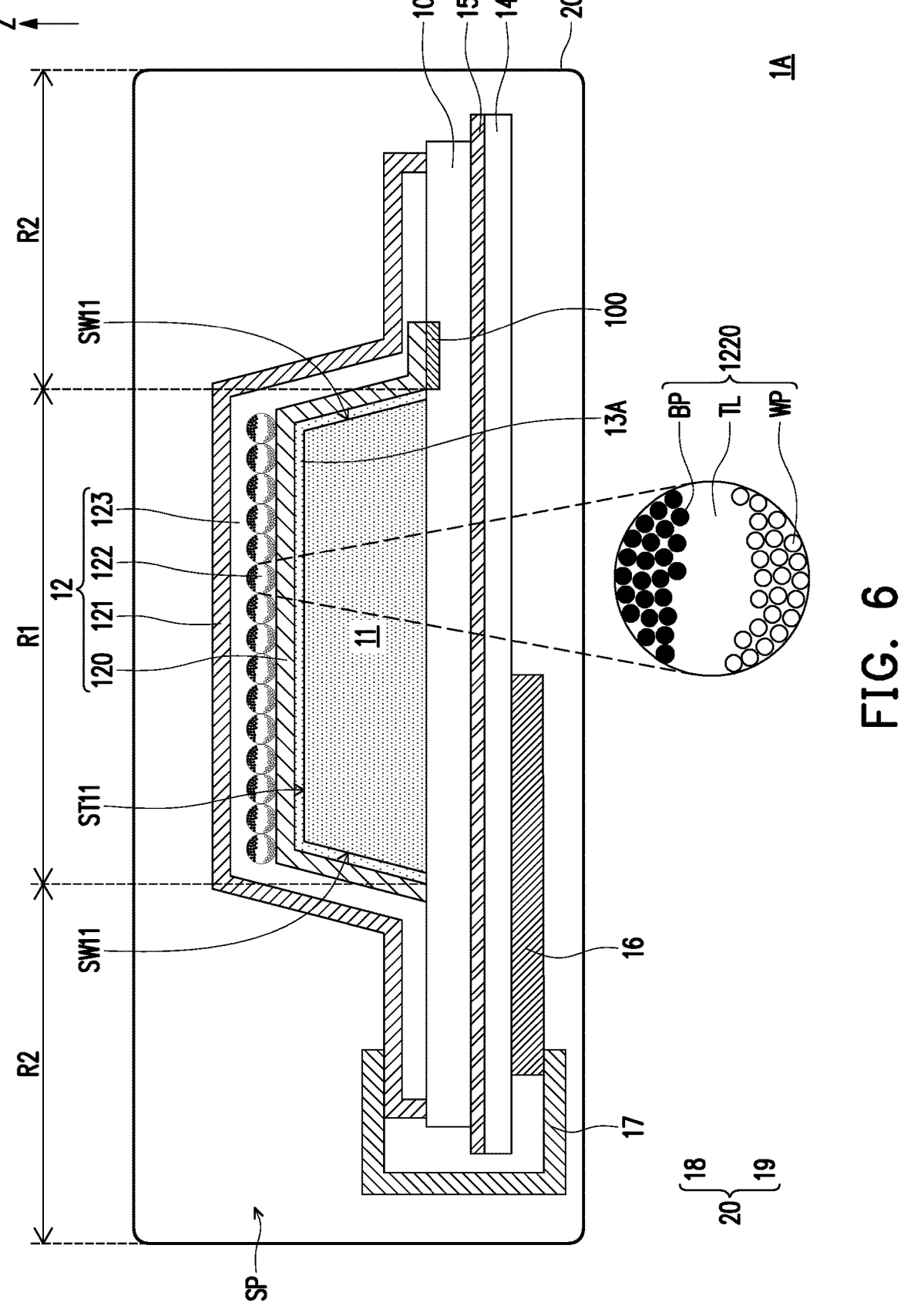
FIG. 6, FIG. 7, and FIG. 10 are respectively a cross-sectional schematic view of an electronic device according to other embodiments of the disclosure.
Figure 7:
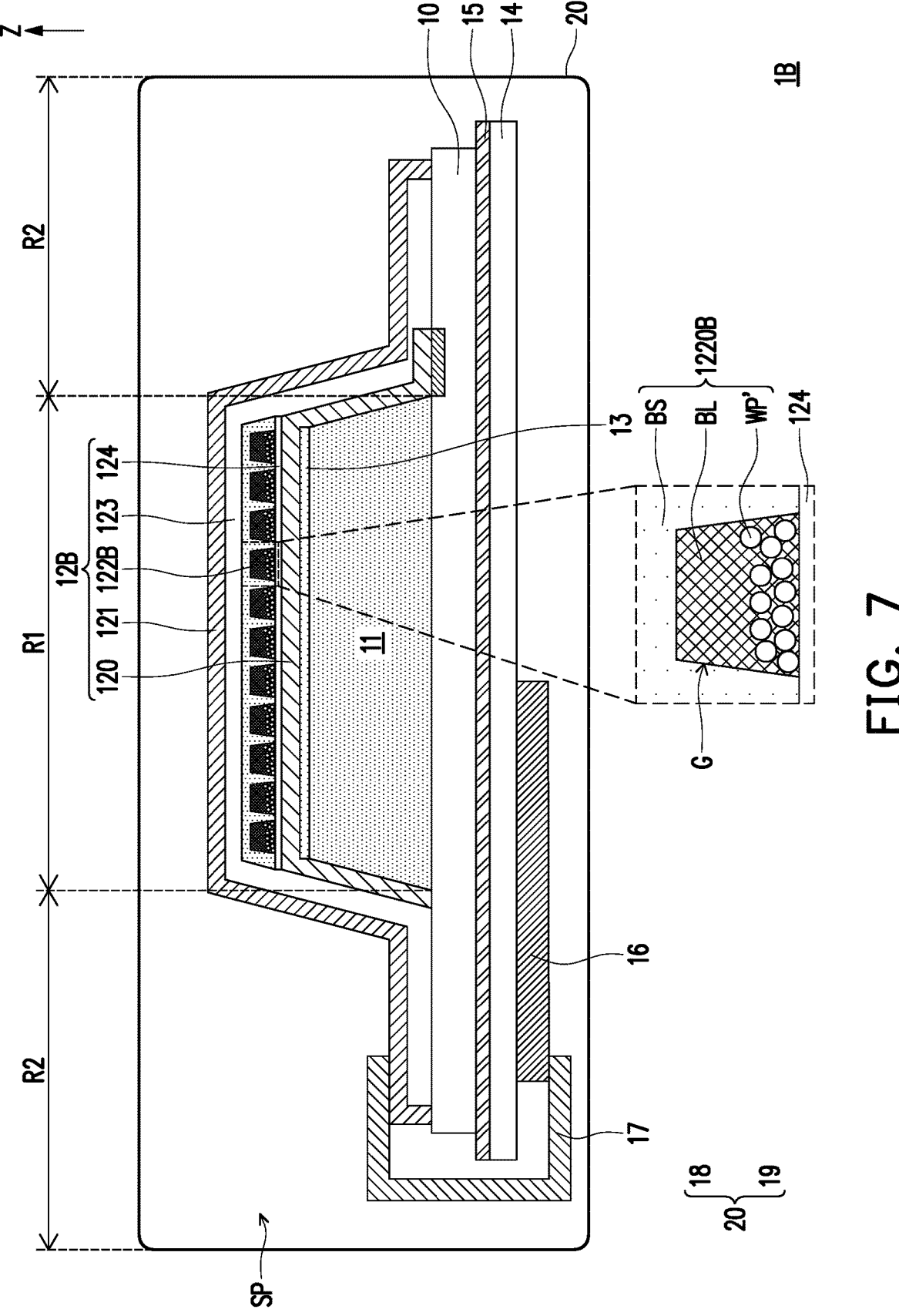
Figure 9:
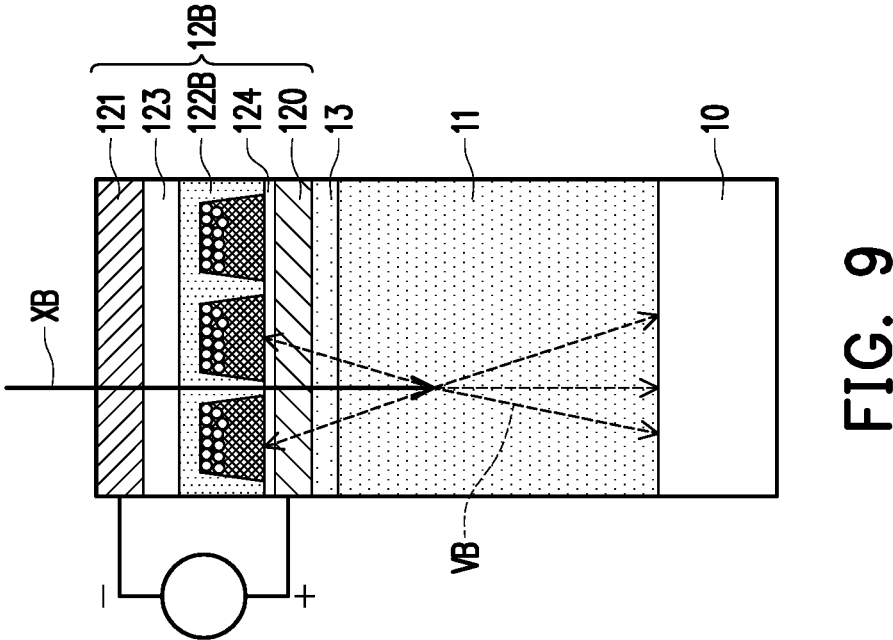
FIG. 8 and FIG. 9 are respectively a partial cross-sectional schematic view of the electronic device of FIG. 7 when switched to high reflectivity and low reflectivity.
Figure 8:
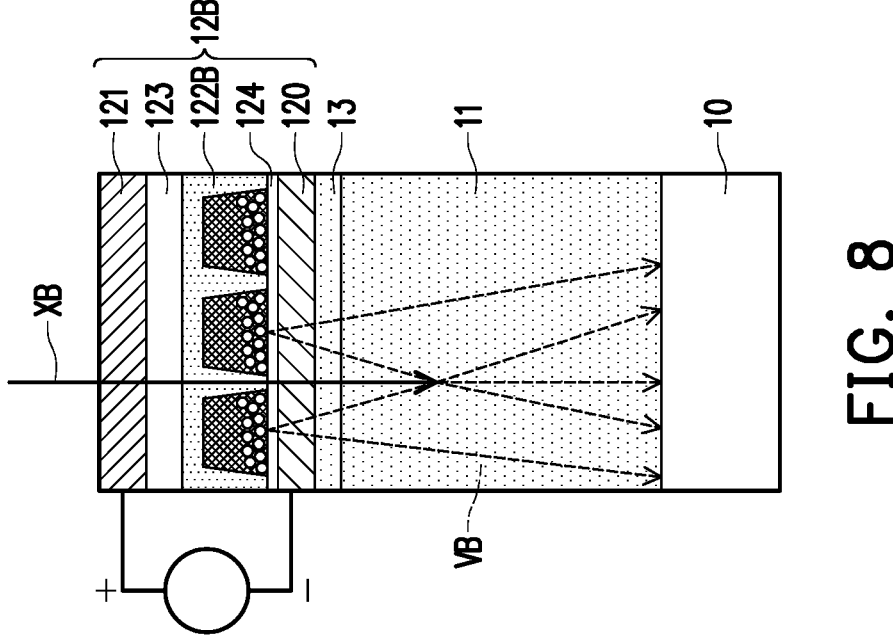
Figure 10:
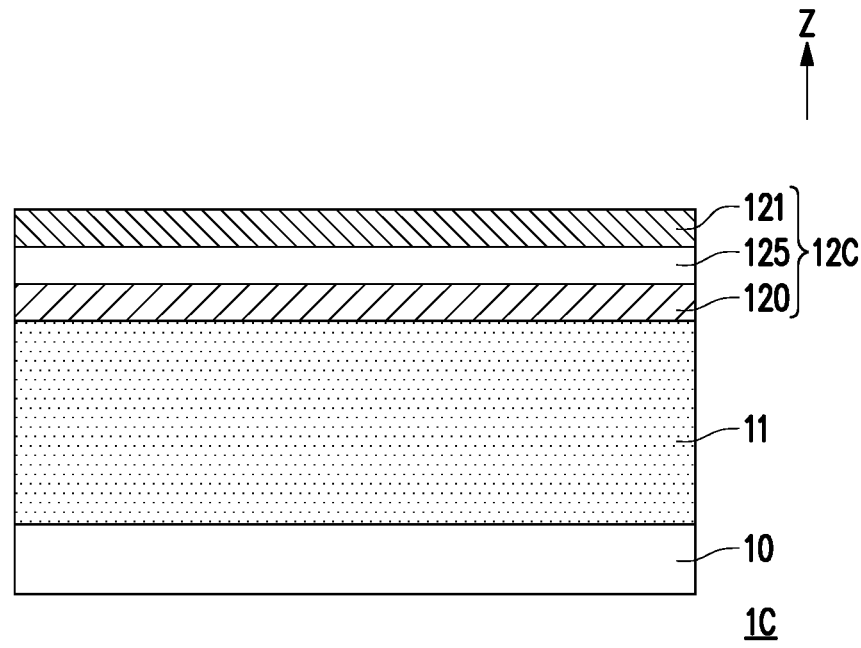

FIG. 1 to FIG. 3 are respectively a top schematic view, an exploded view, and a cross-sectional schematic view of an electronic device according to an embodiment of the disclosure. FIG. 4 and FIG. 5 are respectively a partial cross-sectional schematic view of the electronic device of FIG. 3 when switched to high reflectivity and low reflectivity. FIG. 6, FIG. 7, and FIG. 10 are respectively a cross-sectional schematic view of an electronic device according to other embodiments of the disclosure. FIG. 8 and FIG. 9 are respectively a partial cross-sectional schematic view of the electronic device of FIG. 7 when switched to high reflectivity and low reflectivity.

Please refer to FIG. 1 to FIG. 3. An electronic device 1 may include a sensing substrate 10, a scintillator layer 11, and an adjustable reflective layer 12. The scintillator layer 11 is disposed on the sensing substrate 10. The adjustable reflective layer 12 is disposed on the sensing substrate 10 and includes a first electrode 120, a second electrode 121 and an electrophoretic layer 122. The first electrode 120 is disposed on the scintillator layer 11. The second electrode 121 is disposed on the first electrode 120. The electrophoretic layer 122 is disposed between the first electrode 120 and the second electrode 121, wherein the second electrode 121 surrounds the scintillator layer 11.

In detail, as shown in FIG. 1, the electronic device 1 may include an active region R1 and a peripheral region R2. The peripheral region R2 is connected to the active region R1, and the peripheral region R2 may surround the active region R1, but not limited thereto. As shown in FIG. 3, the active region R1 may be a region overlapping with the scintillator layer 11 in a direction Z, and the peripheral region R2 may be a region not overlapping with the scintillator layer 11 in the direction Z, that is, a region other than the scintillator layer 11.

In the electronic device 1, although not shown, the sensing substrate 10 may include a substrate. The substrate may be used to carry an element or a film layer. According to different requirements, the substrate may be a rigid substrate, a soft substrate, a curved substrate, a flexible substrate, or any type of substrate. In addition, the light transmittance of the substrate is not limited, that is, the substrate may be a light-transmitting substrate, a semi-light-transmitting substrate, or a non-light-transmitting substrate. For example, the material of the substrate may include glass, quartz, sapphire, plastic, ceramics, stainless steel, polyimide (PI), polycarbonate (PC), polyethylene terephthalate (PET), or a combination of the above, but not limited thereto.

Although not shown, the sensing substrate 10 may also include a sensing array. The sensing array is disposed on the substrate and is located between the scintillator layer 11 and the substrate. In addition, the sensing array is located at least in the active region R1 to sense a visible light VB (not shown in FIG. 3, please refer to FIG. 4 or FIG. 5). The sensing array may include multiple sensing units (not shown) and circuits (not shown) electrically connected to the sensing units. The sensing units are arranged in an array on the substrate to generate a two-dimensional image. Each sensing unit may include one or more switch elements and one or more photosensitive elements electrically connected to the one or more switch elements. The switch element may include, for example, a thin film transistor, an integrated circuit (IC), or other suitable switch elements, but not limited thereto. The photosensitive element may include, for example, a photo-diode, a phototransistor, a metal-semiconductor-metal (MSM) photodetector, or other suitable photosensitive elements, but not limited thereto. However, the arrangement manner of the sensing units, the number of switch elements included in each sensing unit, the number of photosensitive elements included in each sensing unit, the type of the switch element, or the type of the photosensitive element may be changed according to requirements and is not limited thereto.

The sensing substrate 10 may further include a pad 100. The pad 100 is disposed on the substrate and is located between the first electrode 120 and the substrate. In addition, the pad 100 is, for example, located in the peripheral region R2, but not limited thereto. The pad 100 may be used to electrically connect the sensing substrate 10 and the adjustable reflective layer 12. For example, the material of the pad 100 may include metal, alloy, other conductive materials, or a combination of the above, but not limited thereto. In some embodiments, the sensing substrate 10 may provide a voltage to the first electrode 120 through the pad 100, but not limited thereto.

The scintillator layer 11 is disposed on the sensing substrate 10. The scintillator layer 11 is suitable for converting an X-ray XB (please refer to FIG. 4 or FIG. 5) incident on the electronic device 1 into the visible light VB (please refer to FIG. 4 or FIG. 5). The sensing array of the sensing substrate 10 is suitable for sensing the visible light VB and generating an image corresponding to a light intensity distribution of the visible light VB. For example, the material of the scintillator layer 11 may include cesium iodide (CsI), but not limited thereto. In other embodiments, the material of the scintillator layer 11 may include other types of inorganic scintillator materials or organic scintillator materials. In some embodiments, the scintillator layer 11 may be formed on the sensing substrate 10 through a deposition process. The deposition process may include a vapor deposition process, but not limited thereto. In other embodiments, although not shown, the scintillator layer 11 may be attached to the sensing substrate 10 through an adhesion layer, that is, the adhesion layer is disposed between the scintillator layer 11 and the sensing substrate 10. The adhesion layer may include an optical clear adhesive (OCA) or an optical clear resin (OCR), but not limited thereto.

The adjustable reflective layer 12 is disposed on the sensing substrate 10, and the scintillator layer 11 is disposed between the adjustable reflective layer 12 and the sensing substrate 10. The first electrode 120 disposed on the scintillator layer 11 may extend from a top surface ST11 of the scintillator layer 11 to the sensing substrate 10 via a side wall SW11 of the scintillator layer 11 and be electrically connected to the pad 100 of the sensing substrate 10. Although FIG. 3 schematically shows that the first electrode 120 covers the side walls SW11 on the left and right sides of the scintillator layer 11, it should be understood that the first electrode 120 may only cover the side wall SW11 of the scintillator layer 11 on the same side as the pad 100 (for example, the side wall SW11 on the right side of the scintillator layer 11 in FIG. 3), but not cover the side wall SW11 of the scintillator layer 11 on the different side from the pad 100 (for example, the side wall SW11 on the left side of the scintillator layer 11 in FIG. 3).

In some embodiments, the first electrode 120 may be attached to the scintillator layer 11 through an adhesion layer 13. As shown in FIG. 3, the electronic device 1 may further include the adhesion layer 13, and the adhesion layer 13 is disposed between the first electrode 120 and the scintillator layer 11.

In some embodiments, as shown in FIG. 3, the adhesion layer 13 may cover the top surface ST11 of the scintillator layer 11 and expose the side wall SW11 of the scintillator layer 11, and the first electrode 120 disposed on the scintillator layer 11 may contact the side wall SW11 of the scintillator layer 11 and the adhesion layer 13. Specifically, a part of the first electrode 120 contacts the adhesion layer 13, and another part of the first electrode 120 contacts the scintillator layer 11 and is electrically connected to the sensing substrate 10. In other embodiments, although not shown in FIG. 3, the adhesion layer 13 may further cover the side wall SW11 of the scintillator layer 11, so that the first electrode 120 does not contact the side wall SW11 of the scintillator layer 11.

The first electrode 120 is suitable for transmitting the X-ray XB (see FIG. 4 or FIG. 5) and the visible light VB (see FIG. 4 or FIG. 5). For example, the first electrode 120 is a transparent electrode. The material of the first electrode 120 includes, for example, a transparent conductive material such as metal oxide, graphene, other suitable transparent conductive materials, or a combination of the above. The metal oxide may include indium tin oxide, indium zinc oxide, aluminum tin oxide, aluminum zinc oxide, indium germanium zinc oxide, or other metal oxides.

The electrophoretic layer 122 is disposed on the first electrode 120 and is located at least in the active region R1. The electrophoretic layer 122 may include a microcapsule 1220 (see FIG. 3) or a microcup structure 1220B (see FIG. 7). As shown in FIG. 3, the microcapsule 1220 may include a white particle WP and a black particle BP. In addition, the microcapsule 1220 may also include a transparent liquid TL. The white particle WP and the black particle BP are suspended in the transparent liquid TL, and the white particle WP and the black particle BP are charged oppositely. For example, the white particle WP is negatively charged and the black particle BP is positively charged.

The second electrode 121 is disposed on the first electrode 120 and surrounds the scintillator layer 11. The second electrode 121 may include a metal foil (for example, an aluminum foil film), so as to reduce the negative impact of moisture on the scintillator layer 11 or prolong the service life of the scintillator layer 11.

In some embodiments, as shown in FIG. 3, the adjustable reflective layer 12 may further include an insulating layer 123. The insulating layer 123 is disposed between the electrophoretic layer 122 and the second electrode 121, and the first electrode 120 and the second electrode 121 may be electrically insulated from each other through the insulating layer 123. The material of the insulating layer 123 may include an insulating colloid, an inorganic insulating material (for example, silicon dioxide or silicon nitride), or an organic insulating material, but not limited thereto.

According to different requirements, the electronic device 1 may also include other elements or film layers. For example, the electronic device 1 may further include a middle plate 14 and a lead plate 15, wherein the middle plate 14 is disposed under the sensing substrate 10, and the lead plate 15 is disposed between the sensing substrate 10 and the middle plate 14. The middle plate 14 may be an aluminum-magnesium alloy plate to implement lightweight or reduce the risk of breaking. The lead plate 15 may be used to shield an X-ray, so as to reduce the probability of the X-ray irradiating an electronic element (not shown) below the middle plate 14, thereby improving the reliability of the electronic device 1. The thickness of the lead plate 15 may be adjusted according to the intensity of the X-ray, but not limited thereto.

The electronic device 1 may also include a circuit board 16. The circuit board 16 is electrically connected to the second electrode 121. For example, the electronic device 1 may further include a connector 17 for electrically connecting the circuit board 16 and the second electrode 121. The connector 17 includes, for example, a flexible circuit board (for example, chip-on-flex (COF) or flexible printed circuit (FPC)), a conductive tape, or other conductive elements.

The electronic device 1 may also include a case 20, and the case 20 may include an upper case 18 and a lower case 19. The upper case 18 and the lower case 19 are assembled together to form a sealed space SP for accommodating the above elements.

Please refer to FIG. 3 to FIG. 5. In the electronic device 1, the reflectivity of the adjustable reflective layer 12 may be adjusted according to different usage requirements. For example, as shown in FIG. 4, when high reflectivity is required, the principle of positive and negative attraction may be used to provide a positive voltage to the first electrode 120 to attract the negatively charged white particle WP to a side of the microcapsule 1220 close to the scintillator layer 11, and provide a negative voltage to the second electrode 121 to attract the positively charged black particle BP to a side of the microcapsule 1220 away from the scintillator layer 11. The white particle WP has higher reflectivity than the black particle BP, and the black particle BP has higher absorbance than the white particle WP. The white particle WP adjacent to the scintillator layer 11 may reflect the visible light VB directed toward the electrophoretic layer 122, so that the visible light VB advances toward the direction of the sensing substrate 10, thereby helping to improve the visible light VB generated by the scintillator layer 11 captured by the sensing substrate 10. In addition, the black particle BP away from the scintillator layer 11 may absorb visible light (not shown) in external ambient light to reduce the interference of the visible light in the external ambient light on the sensing result.

On the other hand, as shown in FIG. 5, when high spatial resolution (low reflectivity) is required, the principle of positive and negative attraction may be used to provide a negative voltage to the first electrode 120 to attract the positively charged black particle BP to a side of the microcapsule 1220 close to the scintillator layer 11, and provide a positive voltage to the second electrode 121 to attract the negatively charged white particle WP to a side of the microcapsule 1220 away from the scintillator layer 11. The black particle BP adjacent to the scintillator layer 11 may absorb the visible light VB directed toward the electrophoretic layer 122, thereby helping to reduce the interference of scattered light or improve the spatial resolution. In addition, the white particle WP away from the scintillator layer 11 may reflect visible light (not shown) in external ambient light to reduce the interference of the visible light in the external ambient light on the sensing result.

Compared with only disposing a light absorbing layer or a reflective layer on the scintillator layer 11, in the embodiment, the adjustable reflective layer 12 with adjustable reflectivity is disposed on the scintillator layer 11 to satisfy different usage requirements.

Please refer to FIG. 6. The main difference between an electronic device 1A and the electronic device 1 of FIG. 3 is described below. In the electronic device 1A, in addition to covering the top surface ST11 of the scintillator layer 11, an adhesion layer 13A also covers the side wall SW11 of the scintillator layer 11, so that the first electrode 120 does not contact the side wall SW11 of the scintillator layer 11. The adhesion layer in the following embodiments may also be changed similarly, which will not be repeated below.

Please refer to FIG. 7. The main difference between an electronic device 1B and the electronic device 1 of FIG. 3 is described below. In the electronic device 1B, an adjustable reflective layer 12B includes the first electrode 120, the second electrode 121, an electrophoretic layer 122B, an insulating layer 123, and a sealing layer 124. The electrophoretic layer 122B includes the microcup structure 1220B. The microcup structure 1220B includes a white particle WP' and a black liquid BL, and the white particle WP' is suspended in the black liquid BL. In addition, the microcup structure 1220B may further include a base BS. The base BS has a groove G for accommodating the white particle WP' and the black liquid BL, and the sealing layer 124, for example, positively charges the white particle WP'.

Please refer to FIG. 7 to FIG. 9. In the electronic device 1B, the reflectivity of the adjustable reflective layer 12B may be adjusted according to different usage requirements. For example, as shown in FIG. 8, when high reflectivity is required, the principle of positive and negative attraction may be used to provide a negative voltage to the first electrode 120 to attract the positively charged white particle WP' to a side of the microcup structure 1220B close to the scintillator layer 11. The white particle WP' adjacent to the scintillator layer 11 may reflect the visible light VB directed toward the electrophoretic layer 122B, so that the visible light VB advances toward the direction of the sensing substrate 10, thereby helping to improve the visible light VB generated by the scintillator layer 11 captured by the sensing substrate 10. In addition, the black liquid BL away from the scintillator layer 11 may absorb visible light (not shown) in external ambient light to reduce the interference of the visible light in the external ambient light on the sensing result.

On the other hand, as shown in FIG. 9, when high spatial resolution (low reflectivity) is required, the principle of positive and negative attraction may be used to provide a negative voltage to the second electrode 121 to attract the positively charged black particle BP to a side of the microcup structure 1220B away from the scintillator layer 11. The black liquid BL adjacent to the scintillator layer 11 may absorb the visible light VB directed toward the electrophoretic layer 122B, thereby helping to reduce the interference of scattered light or improve the spatial resolution. In addition, the white particle WP' away from the scintillator layer 11 may reflect visible light (not shown) in external ambient light to reduce the interference of the visible light in the external ambient light on the sensing result.

Compared with disposing a light absorbing layer or a reflective layer on the scintillator layer 11, in the embodiment, the adjustable reflective layer 12B with adjustable reflectivity is disposed on the scintillator layer 11 to satisfy different usage requirements.

Please refer to FIG. 10. An electronic device 1C includes the sensing substrate 10, the scintillator layer 11, and an adjustable reflective layer 12C. The adjustable reflective layer 12C includes the first electrode 120, the second electrode 121, and a dye liquid crystal layer 125. Through controlling a voltage difference between the first electrode 120 and the second electrode 121, the dye liquid crystal layer 125 may be switched between a transmissive state and a light absorbing state. The material of the first electrode 120 includes, for example, a transparent conductive material such as metal oxide, graphene, other suitable transparent conductive materials, or a combination of the above. The metal oxide may include indium tin oxide, indium zinc oxide, aluminum tin oxide, aluminum zinc oxide, indium germanium zinc oxide, or other metal oxides. The material of the second electrode 121 includes, for example, high reflectivity metal.

When high reflectivity is required, the dye liquid crystal layer 125 may be switched to the transmissive state, and visible light directed toward the dye liquid crystal layer 125 from the scintillator layer 11 is reflected using the second electrode 121 disposed on the dye liquid crystal layer 125, so that the visible light advances toward the direction of the sensing substrate 10, thereby helping to improve the visible light generated by the scintillator layer 11 captured by the sensing substrate 10. In addition, the second electrode 121 may reflect the visible light in external ambient light to reduce the interference of the visible light in the external ambient light on the sensing result.

On the other hand, when high spatial resolution (low reflectivity) is required, the dye liquid crystal layer 125 may be switched to the light absorbing state to absorb the visible light directed toward the dye liquid crystal layer 125 from the scintillator layer 11, thereby helping to reduce the interference of scattered light or improve the spatial resolution. In addition, the second electrode 121 may reflect the visible light in the external ambient light to reduce the interference of the visible light in the external ambient light on the sensing result.

Compared with disposing a light absorbing layer or a reflective layer on the scintillator layer 11, in the embodiment, the adjustable reflective layer 12C with adjustable reflectivity is disposed on the scintillator layer 11 to satisfy different usage requirements.

In other embodiments, although not shown, the second electrode 121 in the adjustable reflective layer 12C may be a transparent electrode, and the adjustable reflective layer 12C may further include a reflective layer disposed on the second electrode 121. Under such framework, the reflectivity of the adjustable reflective layer 12C may also be controlled through switching the state of the dye liquid crystal layer 125, so as to satisfy different usage requirements.

In summary, in the embodiments of the disclosure, the adjustable reflective layer with adjustable reflectivity is disposed on the scintillator layer to satisfy different usage requirements.

The above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

Although the embodiments and the advantages of the disclosure have been disclosed above, it should be understood that any person skilled in the art may make changes, substitutions, and modifications without departing from the spirit and scope of the disclosure, and the features of the embodiments may be arbitrarily mixed and replaced to form other new embodiments. In addition, the protection scope of the disclosure is not limited to processes, machines, manufactures, material compositions, devices, methods, and steps in the specific embodiments described in the specification. Any person skilled in the art may understand conventional or future-developed processes, machines, manufactures, material compositions, devices, methods, and steps from the content of the disclosure as long as the same may implement substantially the same functions or obtain substantially the same results as the embodiments described herein when used according to the disclosure. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic device, comprising:
a sensing substrate;
a scintillator layer, disposed on the sensing substrate; and
an adjustable reflective layer, disposed on the sensing substrate and comprising:
a first electrode, disposed on the scintillator layer;
a second electrode, disposed on the first electrode;
an electrophoretic layer, disposed between the first electrode and the second electrode, wherein the second electrode surrounds the scintillator layer; and
an insulating layer, disposed between the electrophoretic layer and the second electrode.

2. The electronic device according to claim 1, wherein the first electrode contacts a side wall of the scintillator layer.

3. The electronic device according to claim 1, wherein the first electrode extends from a top surface of the scintillator layer to the sensing substrate via at least one side wall of the scintillator layer and is electrically connected to a pad of the sensing substrate.

4. The electronic device according to claim 3, wherein the first electrode covers side walls on left and right sides of the scintillator layer.

5. The electronic device according to claim 3, wherein the first electrode covers a side wall of the scintillator layer on a same side as the pad, but does not cover a side wall of the scintillator layer on a different side from the pad.

6. The electronic device according to claim 1, further comprising:
an adhesion layer, disposed between the first electrode and the scintillator layer.

7. The electronic device according to claim 6, wherein a part of the first electrode contacts the adhesion layer, and another part of the first electrode contacts the scintillator layer and is electrically connected to the sensing substrate.

8. The electronic device according to claim 6, wherein the adhesion layer completely covers the scintillator layer, so that the scintillator layer and the first electrode are separated from each other.

9. The electronic device according to claim 1, wherein the electrophoretic layer comprises a microcapsule, the microcapsule comprises a white particle, a black particle, and a transparent liquid, and the white particle and the black particle are suspended in the transparent liquid.

10. The electronic device according to claim 1, wherein the electrophoretic layer comprises a microcup structure, the microcup structure comprises a white particle and a black liquid, and the white particle is suspended in the black liquid.

11. The electronic device according to claim 10, wherein the microcup structure further comprises a base, and the base has a groove for accommodating the white particle and the black liquid.

12. The electronic device according to claim 11, wherein the adjustable reflective layer further comprises:

a sealing layer, disposed between the microcup structure and the first electrode and seals the white particle and the black liquid in the groove.

13. The electronic device according to claim 1, further comprising:

a middle plate, disposed under the sensing substrate; and a lead plate, disposed between the sensing substrate and the middle plate.

14. The electronic device according to claim 13, wherein the middle plate is an aluminum-magnesium alloy plate.

15. The electronic device according to claim 1, further comprising:

a circuit board, electrically connected to the second electrode.

16. The electronic device according to claim 15, further comprising:

a middle plate, disposed under the sensing substrate; and a lead plate, disposed between the sensing substrate and the middle plate, wherein the circuit board is disposed under the middle plate.

17. The electronic device according to claim 16, further comprising:

a connector, wherein the circuit board is electrically connected to the second electrode through the connector.

18. The electronic device according to claim 17, wherein the connector comprises a flexible circuit board or a conductive tape.

19. The electronic device according to claim 1, further comprising:

an upper case; and a lower case, assembled together with the upper case to form a sealed space for accommodating the sensing substrate, the scintillator layer, and the adjustable reflective layer.

* * * * *